United States Patent [19]

Giraud

[11] 4,271,482

[45] Jun. 2, 1981

[54] DATA PROCESSING SYSTEM WHICH PROTECTS THE SECRECY OF CONFIDENTIAL DATA

[75] Inventor: Georges J. L. Giraud, Le Vesinet, France

[73] Assignee: Compagnie Internationale pour l'Informatique -CII-Honeywell Bull, Paris, France

[21] Appl. No.: 905,453

[22] Filed: May 12, 1978

[30] Foreign Application Priority Data

May 26, 1977 [FR] France .............................. 77 16098

[51] Int. Cl.³ .......................... G06F 7/04; G06K 7/00
[52] U.S. Cl. .................................... 364/900; 235/375; 235/380; 340/149 A
[58] Field of Search ... 364/200 MS File, 900 MS File; 179/2 CA, 2 DP; 340/149 R, 149 A, 543; 235/380, 382, 488, 494, 375

[56] References Cited

U.S. PATENT DOCUMENTS

| | | | |
|---|---|---|---|
| 3,579,186 | 5/1971 | Johnson et al. | 340/149 R X |
| 3,764,742 | 10/1973 | Abbott et al. | 364/200 X |
| 3,806,874 | 4/1974 | Ehrat | 340/149 R |
| 3,806,882 | 4/1974 | Clarke | 340/149 R X |
| 3,868,057 | 2/1975 | Chavez | 340/149 A X |
| 3,934,122 | 1/1976 | Riccitelli | 340/149 A X |
| 3,970,992 | 7/1976 | Boothroyd et al. | 364/900 |
| 4,102,493 | 7/1978 | Moreno | 235/488 X |

Primary Examiner—Gareth D. Shaw
Assistant Examiner—Thomas M. Heckler
Attorney, Agent, or Firm—Kerkam, Stowell, Kondracki & Clarke

[57] ABSTRACT

A data processing system which protects the secrecy of confidential information includes a data processing machine with which an operator may carry on a confidential dialogue through a data transmitting device such as a keyboard and an auxiliary device in which is stored a predetermined permanent code key which controls access to the machine upon comparison to and recognition of a confidential code personal to the user. The auxiliary device may take the form of a card having an electronic integrated circuit means thereon and a plurality of contact members which are respectively connected to the circuit means by integrated connections. The contact members are designed to generate in response to external contact by a user operated stylus, a set of basic items of information corresponding to the confidential code personal to the user. The user code is compared to the permanent code key and a signal is generated which permits the dialogue between the machine and data transmitting device to take place if the coded data inputted by the user corresponds to the permanently stored code key. To this end, the circuit means includes at least a memory for storing the permanent code, an encoder connected to the contact members and a comparator connected to compare the permanent code key and inputted coded data.

10 Claims, 7 Drawing Figures

DATA PROCESSING SYSTEM WHICH PROTECTS THE SECRECY OF CONFIDENTIAL DATA

BACKGROUND OF THE INVENTION

1. Field of the Invention

The present invention relates to a data procesing system which protects the secrecy of confidential data.

2. Description of the Prior Art

A first example of systems of this nature is provided by systems which comprise a data processing machine which is connected to a data transmitting device by means of which an operator is able to communicate with the machine. The machine includes an auxiliary device in which is stored a predetermined item of confidential information, termed a key or code key, which governs access to the machine. A dialogue is only permitted between an operator and the machine if the confidential code held by the operator is recognized as identical to the key.

A second example of known systems relates to systems which employ credit and/or debit cards. In this case, the auxiliary device is formed by a personal card held by an operator in which the personal key is stored. Access to the machine is reserved for any user of the card who knows the confidential code identical to the key. It is only if the data transmitting device detects such identity that the user of the card is able to gain access to confidential data contained in the machine.

In these two illustrative cases, when an operator wishes to carry on a confidential dialogue with a machine, he begins by feeding in a confidential code, generally from a keyboard, and this code, once it has been recognized as identical to the key, allows him to transmit other information by means of the same keyboard and the intermediate transmitting device between the operator and the machine. In the case of the first example given above, it is also possible for anyone which has possession of the confidential code to gain access directly to the machine by formulating the code on the keyboard. In the case of the second example which employs credit cards, it is also necessary to have possession of the card in which is recorded the key corresponding to the confidential code which may have been surreptitiously acquired. A dual safequard is required in this latter case. In effect, if a card is stolen, steps must be taken to ensure that the key recorded in it cannot be read. In addition, it is necessary to prevent the discovery of the confidential code held by the legitimate possessor of the card when the latter formulates it on the keyboard (which is a public device) in the course of a preliminary operation to begin a dialogue with the machine.

Whether or not the confidential code formulated by a user is identical with the key stored in the card which he holds is determined by comparing the code with the key. One possibility is to make this comparison by placing a comparator in the data transmitting device to which data is transmitted by a keyboard. This solution has the disadvantage that it makes it possible to intercept the code key when the code is formulated on the keyboard by a user for comparison with the stored code key. Another solution which has been made possible by progress in integrated circuit techniques is to include the comparator means in the same card as the memory containing the key. This prevents any interception while the memory is being read out since the memory is no longer physically separated from the comparator as it was in the previous case.

However, the latter solution does not eliminate the risk of interception during the transfer of the code formulated on the keyboard to the comparator. In effect, the keyboard situated as it normally is in the transmitting device, in a publically accessible location, is thus physically separated from the card in which the comparator is situated and susceptible of having the formulated code intercepted.

Another example of a data processing system which protects the secrecy of confidential data is disclosed in U.S. application Ser. No. 900,503 of Giraud et al, filed Apr. 22, 1979 and corresponding to French application No. 77-12781 and assigned to the assignee of the present invention. In that application, a light pen personal to each operator is used for formulating confidential data in a predetermined code and transmitting coded information by means of a lightwave. Reference may be had to said application for a better understanding of the prior art and the advantages of the present invention.

SUMMARY OF THE INVENTION

The present invention presents a way of protecting the secrecy of the confidential code in data processing systems. To this end, a data processing system according to the invention comprises a data processing machine provided with a data transmitting device and an auxiliary device for controlling access to the machine. The auxiliary device may take the form of a card including integrated circuit means having a memory for the permanent storage of a key code and comparator means for comparing this key code with a confidential code personal to the user. Correspondence between the key code and the predetermined confidential code enables the data transmitting device to be given exclusive access to the machine under control of the auxiliary device which includes a plurality of contact members connected by respective integrated connections through an encoder to the comparator means. The contact members generate, by contact from outside the auxiliary device, such as a stylus, a set of individual items of information forming a confidential code which can be compared with the code key permanently stored in the memory.

BRIEF DESCRIPTION OF THE DRAWINGS

The features and advantages of the invention will become more clear from the following description, which is given with reference to the accompanying Figures. Because the individual logic circuit elements, employed in the invention are well known and standard in the art, such elements are generally shown in their block form.

DESCRIPTION OF THE PREFERRED EMBODIMENTS

Figure 1:
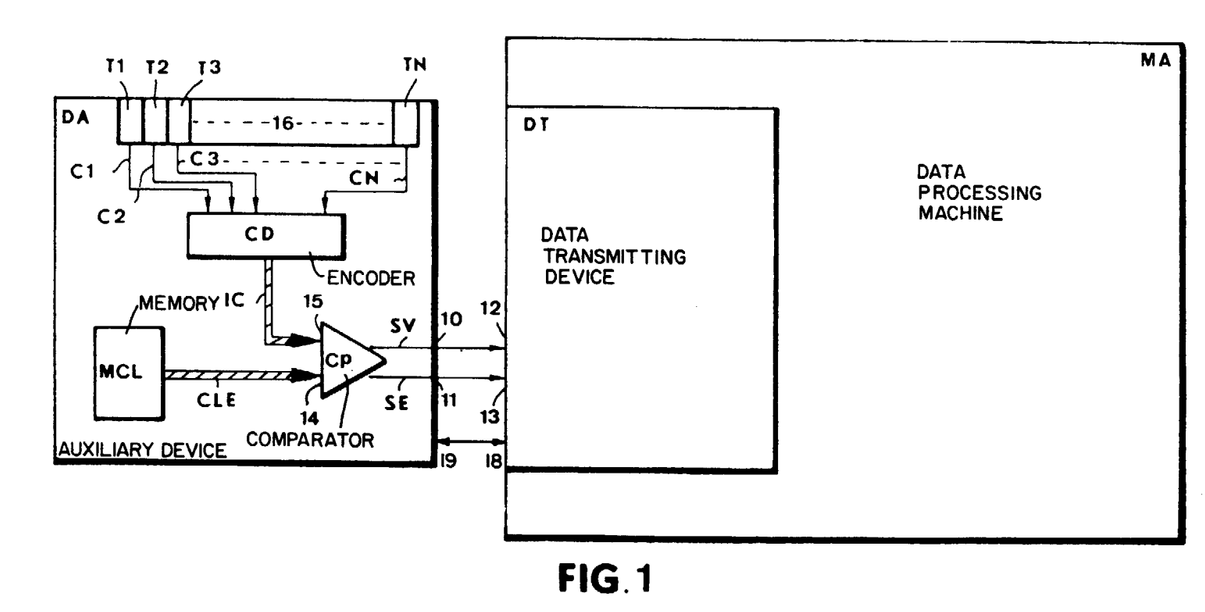
FIG. 1 is a general block diagram of the data processing system according to the invention.

FIG. 1 illustrates generally the principle of the invention. The data processing system according to the invention comprises a data processing machine MA, the data transmitting device DT which generally includes a keyboard (not shown) for establishing communication between a user or operator and the machine. The system also includes an auxiliary device DA, which may take the form of a credit card or the like. Device DA is connected by two outputs 10 and 11 respectively to two corresponding inputs 12 and 13 of device DT. The auxiliary device DA contains a memory MCL in which is stored a predetermined code key which forms an identification individual to the auxiliary device within which the memory is situated. Device DA also contains an encoder CD and a comparator Cp connected by input 14 to memory MCL in order to allow the code key CLE to be compared with coded data IC which is received from the encoder CD at its other input 15.

The comparator Cp forms an authorizer circuit and is designed to generate at a first output a signal SV which is transmitted to output 10 of device DA when the data IC received at the input 15 is identical to the code key CLE received at the input 14. Comparator Cp may also generate a signal SE from a second output which may be transmitted to output 11 of device DA when the data IC is different from the key CLE.

A set N of integrated connections C1, C2, C3 . . . CN are provided to connect N edge contact members T1, T2, T3 . . . TN respectively to N inputs of the encoder CD. The plurality of N contact members 16 is designed to be accessible to an operator from outside the auxiliary device. In this manner, the operator or user can thus feed into the encoder CD an n-bit confidential code CC by making contact in succession with n of the N contact members, the number n being less than or equal to N.

Figure 2:
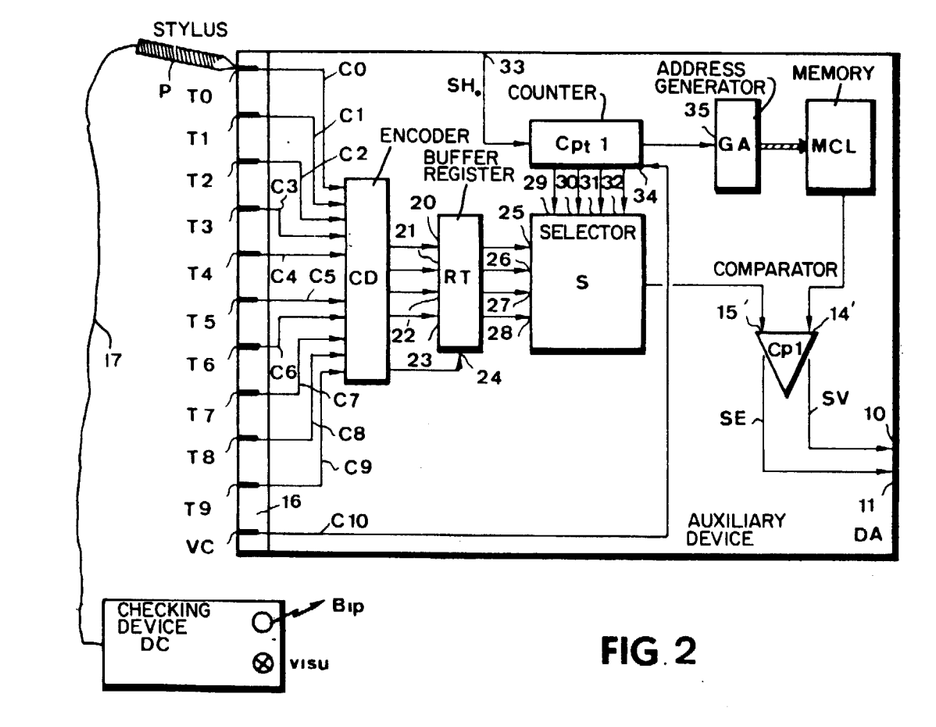
FIG. 2 is a general block diagram of a first embodiment of an auxiliary device employed in the system according to the invention shown in FIG. 1.

A first embodiment of the auxiliary device DA of FIG. 1 is shown in FIG. 2, as is also a particular method of making contact with the members T0-T9 so as to allow a confidential code CC to be fed into the device DA by an operator. Contact is achieved by the application of a stylus P to selectively ground a contact member. To this end, the stylus P is connected electrically to earth or ground via checking device DC. Thus, when reference is made to teaching a key or contact terminal, it should be apparent that the key or contact terminal is grounded by application of the stylus member. Each contact member of "key" may be accessible through an opening or edge slot formed in a plastic material when the auxiliary device is, for example, a credit card. The plurality of N contact members 16 in FIG. 2 consists of ten keys or slots T0, T1, T2 . . . T9, and an additional key or slot VC which enables the various items of the confidential code formulated by the operator to be validated in succession in the card. If, for example, the operator wishes to feed in the code 2356, he applies the stylus P to the contact member or key VC after having applied it to each of the keys T2, T3, T5 and T6. Checking device DC is connected to the stylus P by a lead 17 in which an electrical current normally flows each time the stylus is brought into contact with a contact member.

Checking device DC is designed on the one hand to selectively establish a ground connection with a touched contact member and on the other hand, to check that the contact has, in fact, been established with the card each time the stylus P is applied. The ckeck on the establishment of contact is, for example, effected either by an acoustic signal emitted by a member Bip, or by a light signal emitted by a visual indicator VISU.

The encoder CD has ten inputs which, as showin in FIG. 2, are connected to the ten contact terminals or keys T0, T1, T2 . . . T9 respectively by ten integrated connections C0, C1, C2 . . . C9. The encoder CD is conventional and may be a 10/4 encoder which converts the decimal information applied be selective contact of the terminals into a four bit item Ie of coded data applied from four outputs to inputs 20, 21, 22 and 23 respectively of a buffer register RT in device DA. The data items Ie generated by encoding an element of the code CC which is fed in by touching one of the keys T0 to T9 with the stylus. Encoder CD includes a fifth output connected to input 24 of register RT. Each time the encoder CD is ready to emit a new item of data Ie, it emits a signal from the fifth output which enables the register RT to be reset to zero. The item of data IC which, in the general block diagram of FIG. 1 is transmitted to terminal 15 of the comparator Cp is transmitted, as shown in FIG. 2, via a selector circuit S. To distinguish between the circuit of FIG. 1 and the more detailed circuit of FIG. 2, the comparator in FIG. 2 has been designated Cp1 and its inputs 14' and 15'. It should be readily apparent that this corresponds operationally to comparator Cp and inputs 14 and 15 of FIG. 1. Thus, the IC output data of selector S is applied to input 15' of comparator Cp1 which receives one by one the four bits making up the item of data Ie. The selector circuit S receives the four bits of the data item Ie in parallel from register RT at its four inputs 25, 26, 27, 28 and it emits them one by one under the control of a counter Cpt1. Counter Cpt1 transmits signals in succession to four other inputs 20, 30, 31 and 32 of selector circuit S.

The counter Cpt1 is controlled by a clock signal SHo received by an input 33 of device DA. These signals SHo are transmitted through contacts 18 and 19, for example, by a clock circuit (not shown) contained in the data processing machine MA to which the device DA is connected via device DT. As should be apparent, contacts 18 and 19, as well as contacts 10 and 12 and 11 and 13, may be connected by inserting device DA when it is in the form of a card in a proper slot in transmitting device DT. The operation of counter Cpt1 is validated by signals which are received at an input 34 which is connected by an integrated connection C10 to contact terminal or key VC, each time the latter is in contact with the stylus P. The counter Cpt1 is also used to read out the code key CLE bit by bit from the memory MCL in FIGS. 1 and 2. To effect proper synchronization, the counter Cpt1 has a fifth output connected to an input 35 of an address generator GA. Generator GA is designed to cause the code key CLE to be read out bit by bit from the memory MCL. Each bit is transmitted to an input 14' of comparator Cp1. At the same time, comparator Cp1 receives at input 15' each bit of the item of data Ie which is transmitted via the selector circuit S under the control of comparator Cpt1 in response to signals which are received in succession at inputs 29, 30, 31 and 32 respectively. In each bit of the code key CLE and of the data IC formed by a set of n items Ie is identical, a signal SV is transmitted to output 10 of device DA, whereas a signal SE is transmitted to output 11 if the code key CLE and data IC are different.

Figure 3A:
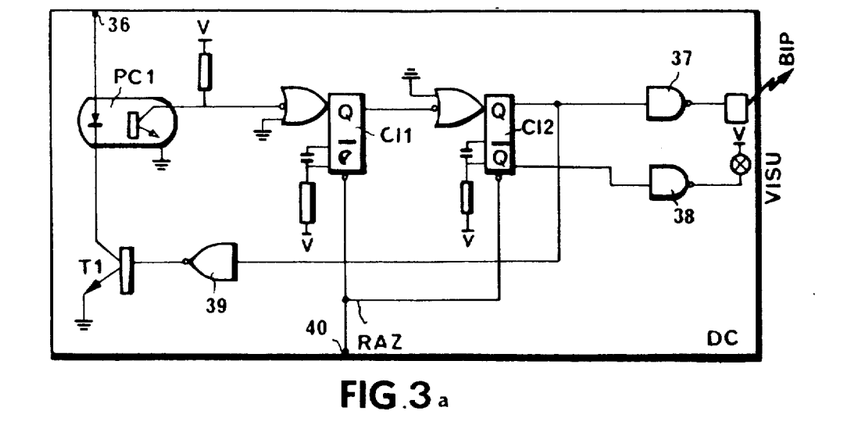
FIG. 3a is a block diagram of an embodiment of a contact checking device associated with the auxiliary device of FIG. 2.

An embodimet of the checking device DC is shown in FIG. 3a. This device contains a photo-coupler PC1 which is connected via an input 36 to the lead 17 of the stylus P in FIG. 2, and to a transistor T1 connected to ground as shown in FIG. 3a. The acoustic and visual members Bip and VISU are connected to the photo-coupler PC1 by two monostable vibrator circuits CI1 and CI2 in device DC. Monostable CI2 is connected on the one hand to members Bip and VISU via two inverters 37 and 38 and on the other hand to transistor T1 via an inverter 39. The two monostables CI1 and CI2 are reset to zero from an RAZ input 40 of device DC which is, for example, connected externally to a shared zero-reset circuit of the machine MA. In operation, when the stylus P is applied to one of the terminals or keys of device DA, a current circulates in the lead and flows to ground through the photo-coupler PC1 and the collector-emitter junction of transistor T1, which is saturated. This current is detected by PC1 and the latter transmits a negative pulse to the input of monostable CI1. CI1, by virtue of its connection to monostable CI2, enables the transistor T1 connected via inverter 39 to be saturated. Members Bip and VISU are connected to the Q and $\bar{Q}$ outputs respectively of monostable CI1, and are thus actuated in the alternative cases where the stylus P does or does not make contact.

Figure 3B:
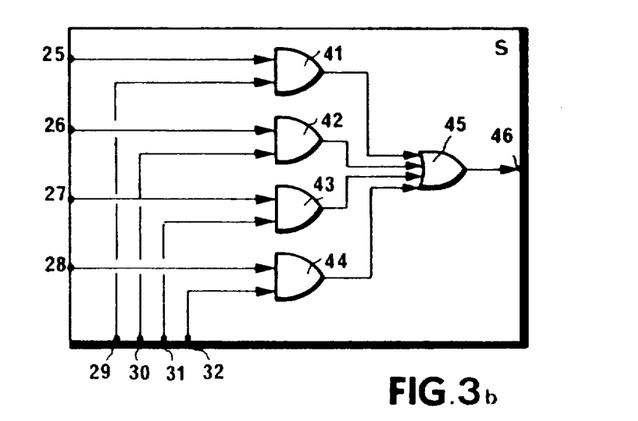
FIG. 3b is a block diagram of an embodiment of a selector circuit contained in the auxiliary device of FIG. 2.

FIG. 3b illustrates the selector circuit S of FIG. 2 which comprises a set of four AND gates 41, 42, 43, 44, connected to register RT by respective first inputs to inputs 25, 26, 27 and 28 and to counter Cpt1 by respective second inputs to inputs 29, 30, 31 and 32. The outputs of the four AND gates are connected respectively to four inputs of an OR gate 45 whose output is connected to an output 46 from which the circuit S transmits the data item Ie bit by bit to input 15' of the comparator Cp1 of FIG. 2. Thus, in response to the signals which are transmitted from counter Cpt1 to inputs 29, 31, 31 32 in succession, the four bits received at inputs 25, 26, 27 and 28 are transmitted in succession through gates 41, 42 43 and 44 and gate 45 to the output 46. The counter Cpt1 which is responsible for controlling the circuit S to allow the four bits of the data item Ie to be transmitted in sequence, is put into operation by a first signal, which is received at its inputs 34, shown in FIG. 2, when the terminal or key VC is grounded for a first time by contact with the stylus.

Each time the stylus makes contact with the terminal or key VC, generator GA is incremented by one unit, thus enabling the four bits of the code key CLE recorded in memory MCL to be read out.

Figure 4:
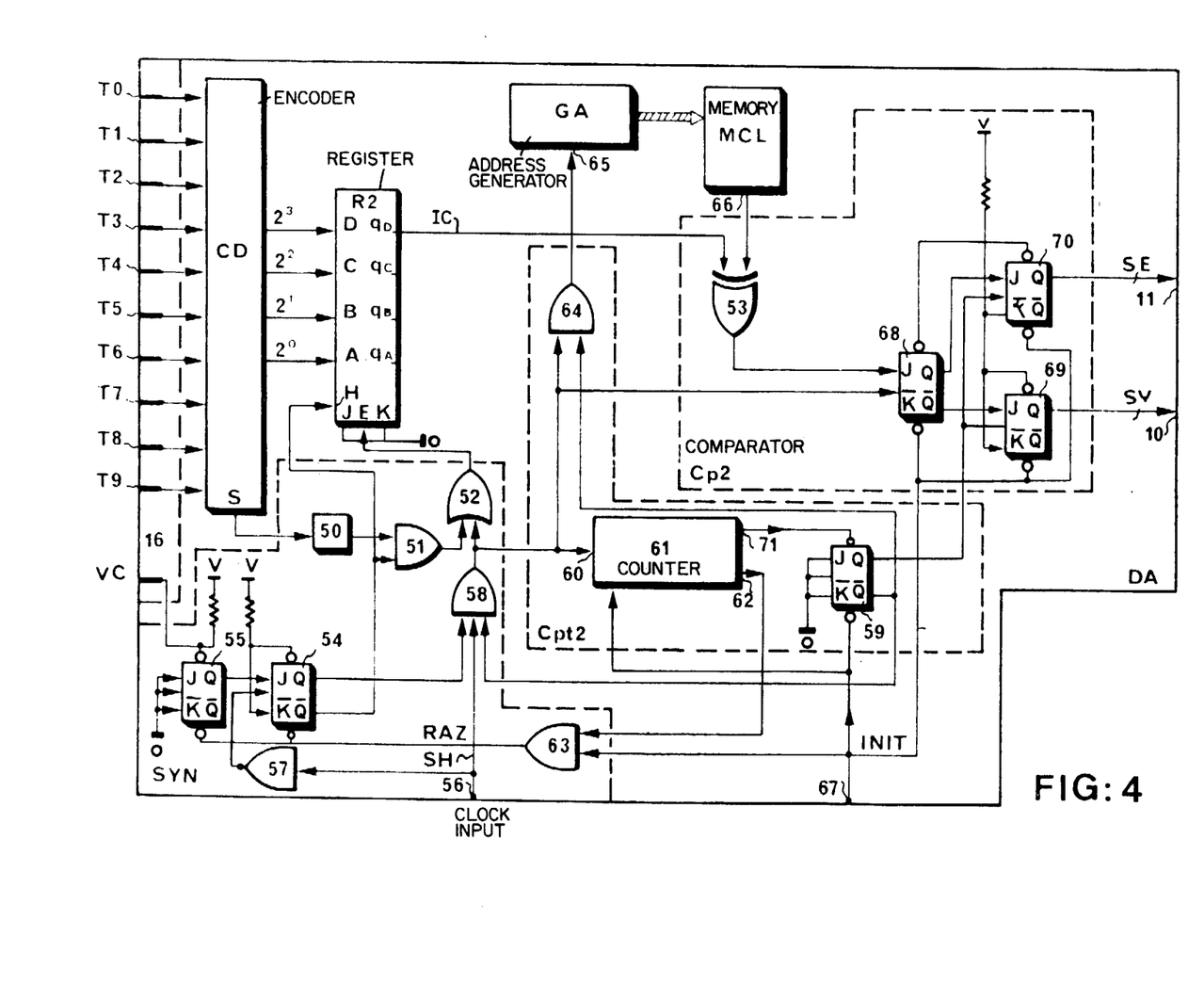
FIG. 4 is a block diagram of a second embodiment of an auxiliary device used in the system according to the invention shown in FIG. 1.

Another embodiment of the auxiliary device DA of FIG. 1 is shown in FIG. 4. It also includes a register R2 which is operatively connected to the plurality of keys T0, T1, T2 . . . T9 of the encoder CD, and an address generator GA which is connected to the memory MCL. The device DA also includes comparator circuit means Cp2, counting circuit means Cpt2 and synchronizing circuit means SYN. The comparator means Cp2, the counter means Cpt2 and the synchronizing means SYN of FIG. 4 are separately set off by dash lines.

Touching the keys with the stylus enables the encoder CD to be loaded via the respective integrated connections and coded data IC to be transmitted, item Ie by item Ie, from four outputs $2^0$, $2^1$, $2^2$, $2^3$ of the encoder CD to inputs A, B, C, D, of register R2, respectively. At an output S of the encoder CD is generated a sampling pulse which is transmitted to a delay device 50 in the SYN circuit to control, via an AND gate 51 and an OR gate 52 connected to an input E of register R2, the loading into this register of the data item Ie encoded by circuit CD. The four bits of the data item Ie fed into register R2 at its inputs ABCD are then serially transmitted one by one to a comparator stage 53 in the comparator circuit Cp2 under the control of clock signals from an AND gate 58. The clock signals are generated at the Q output of a flip-flop 54. Grounding of contact terminal VC sets the Q output of flip-flop 54 to 1 via flip-flop 55 when flip-flop 54 receives the trailing edge of a clock pulse $SH_0$ from gate 57.

The clock signals $SH_0$ are received at an input 56 of device DA by means which may be identical to those shown in FIG. 2 and described in connection therewith. Signals $SH_O$ received at input 56 are transmitted to flip-flop 54 via an inverter 57. An AND gate 58 is connected by a first input to the Q output of flip-flop 54, by a second input in the input 56 for the signals $SH_O$, and by a third input to a Q output of a flip-flop 59, with the result that gate 58 transmits the signals $SH_O$ to a second input of OR gate 52 when the Q and Q outputs of flip-flop 54 and 59, respectively are at 1.

The output of gate 58, which is connected to OR gate 52, is also connected to an input 60 of a counter 61 forming part of circuit means Cpt2. A first output 62 of counter 61 is connected to flip-flop 54 and 55 via an OR gate 63 enable these flip-flops to be reset to zero by a signal RAZ, the RAZ signal is generated at every four clock pulses counted by counter 61 and validated by the signal generated by the Q output of flip-flop 54.

The output of gate 58 is also connected to a first input of an AND gate 64. A second input of gate 64 is connected to the same Q output of flip-flop 59 as the third input of gate 58. The signal generated from the output of gate 64 is applied at input 65 and enables the generator GA to be actuated with the result that each of the four bits of one element of the key CLE contained in memory MCL is addressed in synchronization with the four bits of a data item Ie which are emitted in succession from the output of register R2. Each bit which is transmitted from output 66 of memory MCL to comparator 53 is compared with a bit transmitted from an output $Q_D$ of register R2 by means of the synchronization provided by circuit means SYN, which latter is connected to key VC, to the output S of the encoder CD, to two inputs E and H of register R2, and to counting circuit Cpt2, to the generator GA, and to the comparator circuit Cp2. Each sequence of comparing the four bits of one element of the key CLE with four bits of an item of data Ie (resulting from the encoding of an element of the code CC formulated by an operator) comes to an end as soon as the counter 61, having counted four pulses, generates a signal at output 62. It will be noted that an initiating signal INIT received at an input 67 of device DA enables the device to be initialized when it is put into operation by resetting to zero the flip-flops 54 and 55 in the SYN circuit, the flip-flop 59 in circuit Cpt2, and three other flip-flops 68, 69 and 70 contained in the comparator circuit Cp2, and also the counter 61.

If the bits from memory MCL and from register R2 which are compared are identical, no signal is generated at the output of comparator 53 and flip-flop 68 remains in its zero state. If the bits are different, the output of comparator 53 generates a signal which sets flip-flop 68 to its 1 state at the rising edge of a clock signal $SH_O$ transmitted by gate 68. In one embodiment, the counter 61 is designed to generate a signal at an output 71 at every sixteen pulses validated by gate 58. This interval corresponds by definition to a checking period during which device DA checks whether the code CC is in fact that which gives access to the machine. A signal from the output 71 of counter 61 is connected to flip-flop 59 and enables the latter to be set to its 1 state. The Q output of flip-flop 59 sets flip-flop 69 to its 1 state which then generates a signal SV at its Q output which is transmitted to output 10 of device DA. In the event of an error being detected by comparator 53, the latter transmits a signal to flip-flop 68 which in turn sets flip-flop 70 to its 1 state. A signal SE generated at the Q of flip-flop 70 is then transmitted to output $1_1$ of device DA.

Figure 5:
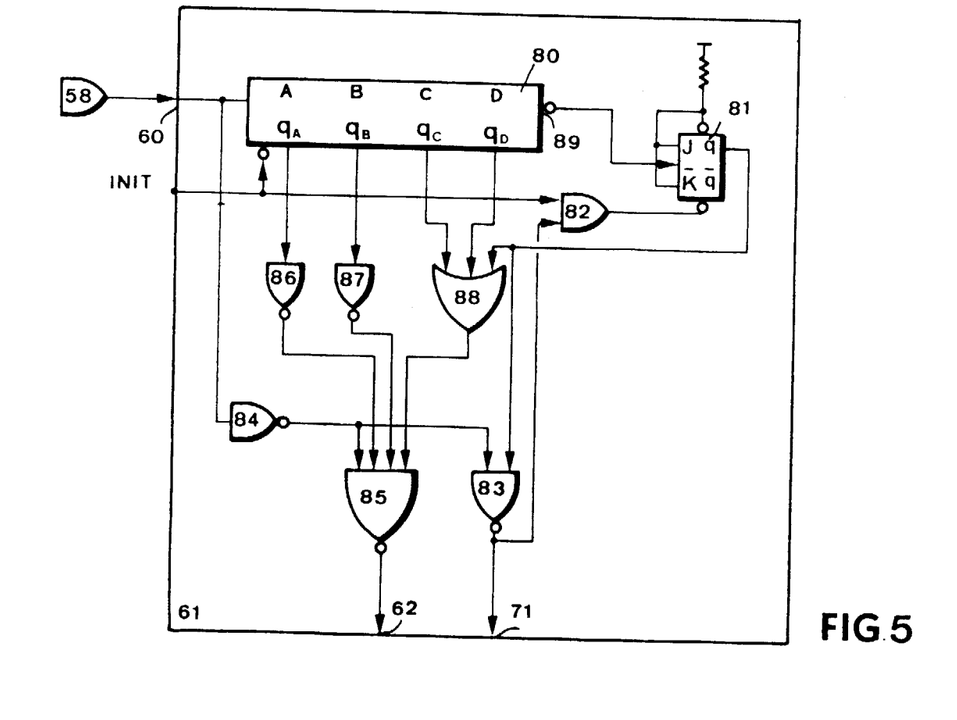
FIG. 5 is a block diagram of an embodiment of a counting circuit contained in the auxiliary device of FIG. 4.

As shown in FIG. 5, counter 61 of FIG. 4 contains a basic counter circuit 80 having four outputs $Q_A$, $Q_B$, $Q_C$, $Q_D$. The counter 80 is driven from an input 60 connected to the gate 58 of FIG. 4 and is reset to zero by the initializing signal INIT which is received at input 67 of the device DA of FIG. 4. The INIT signal resets flip-flop 81 to zero by means of OR gate 82 which is also connected to the output of a NAND gate 83 by which the checking signal at output 71 of the counter 61 of FIGS. 4 and 5 is generated. Flip-flop 81 is thus reset to zero by gate 82 when the device DA is initialized and also at the end of each checking period in the course of which a predetermined number of clock pulses $SH_O$ are counted, the number being 16, for example. A gate 85 emits a signal from its output when a clock signal $SH_O$ which is transmitted by a NAND inverter 84 is present at input 60. Gate 85 has its output connected to output terminal 62 of the counter 61 of FIGS. 4 and 5, to which it transmits a signal when there is no signal at its first input connected to an inverter 84. Two other inputs of gate 85 are connected to outputs $Q_A$, $Q_B$, respectively, of counter 80 via two inverters 86 and 87. A fourth input of gate 85 is connected to an OR gate 88. The condition of there being no signals at the four inputs of gate 85 is fulfilled when the counter 80 has counted four clock pulses $SH_O$. In this case a signal is generated only at outputs $Q_A$ and $Q_B$ of counter 80. When the counter 80 has counted sixteen pulses, a signal is generated at all four outputs, $Q_A$, $Q_B$, $Q_C$, $Q_D$, but in this case the counter 80 produces no signal at a fifth output terminal 89. As a result, the flip-flop 81 to which terminal output 89 is connected is set to zero. Flip-flop 81 is reset to zero after sixteen pulses and its Q output no longer transmits a signal to gate 88 on the one hand and to gate 83 on the other hand. Thus, for every four pulses, a signal is generated only at the output of gate 85 and for every sixteen pulses a signal is generated at the outputs of gates 85 and 83.

Figure 6:
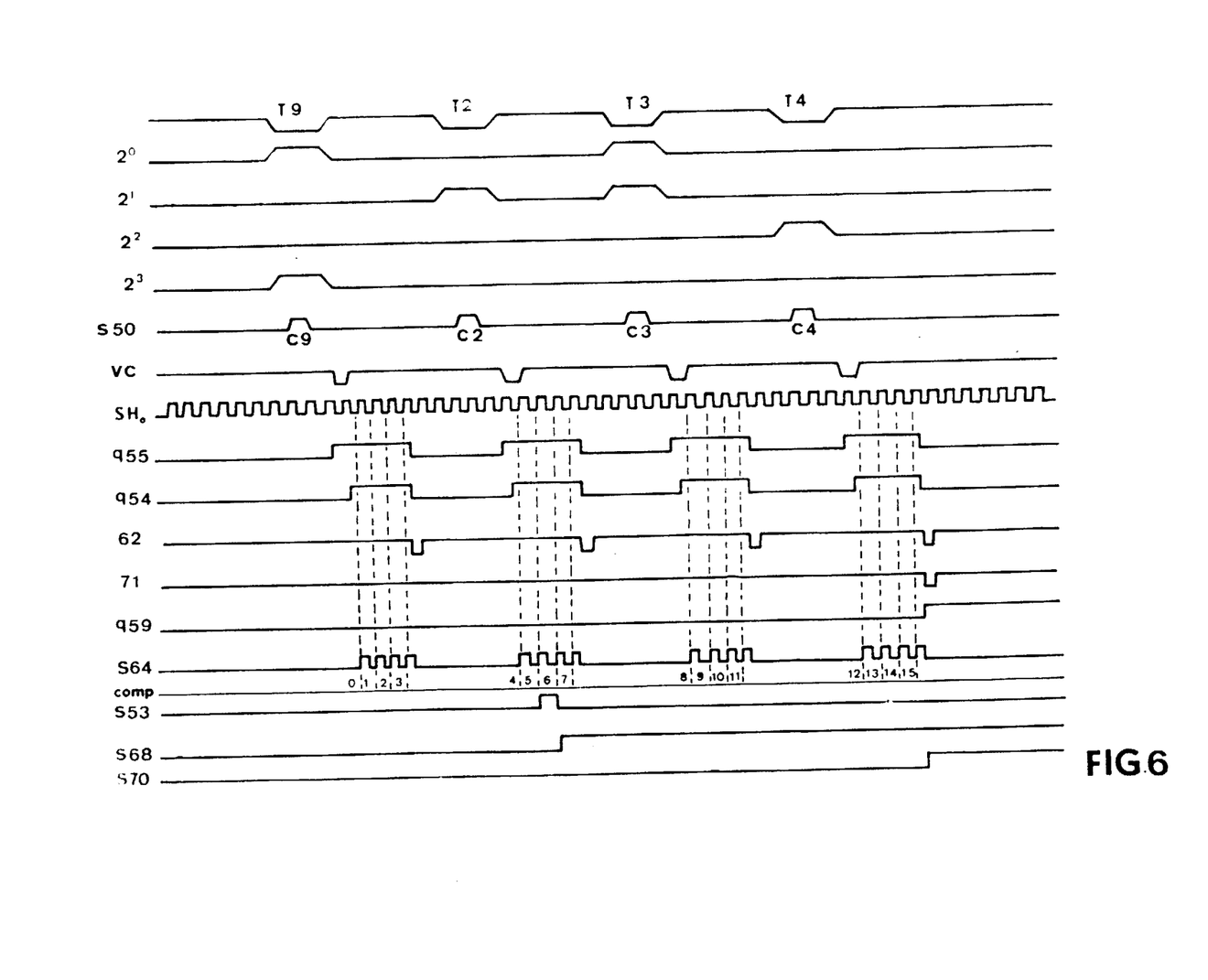
FIG. 6 is a timing diagram for the signals generated in the auxiliary device of FIG. 4.

FIG. 6 is a timing diagram of the signals generated in the device DA of FIG. 4 in the case where keys T9, T2, T3, T4 have been touched or grounded. Touching key T9 causes pulses to be generated at outputs $2^0$ and $2^3$ of the encoder CD of FIGS. 2 and 4. Touching key T2 enables a pulse to be generated at output $2^1$. Touching key T3 enables a pulse to be generated at outputs $2^0$ and $2^1$, while key T4 generates a pulse at output $2^2$ of encoder CD. Thus, a confidential code CC corresponding to the decimal number 9234 is fed into the device DA by touching key T9, T2, T3 and T4. The code is fed in succession and is coded into data IC which is the result of the successive encoding of each element of the code CC. The encoder CD of FIG. 4 transmits in succession to the register R2 the code elements corresponding to key T9 being touched, which is indicated at C9 in FIG. 6. C2, C3, C4 represent the codes stored in succession in register R2 which result from keys T2, T3 and T4 being touched. Touching key VC enables the storage of each code element, such as code C9, in register R2 to be validated by a pulse which is transmitted to input H of the register R2 in FIG. 4 and which, as FIG. 6 indicates, lags behind the pulse which forms the code which it validates, this being C9, for example. The clock pulses $SH_O$ which are intended to synchronize the various parts of the device DA by means of the circuit SYN in FIG. 4 are indicated in FIG. 6. Also indicated are the pulses which are generated at the Q outputs of flip-flops 55 and 54 respectively of FIG. 4, the first of which is synchronized with the pulse resulting from touching key VC and the second of which is displaced in time with respect to the first. Since the Q output of flip-flop 54 is connected in FIG. 4 to the gate 58 by the which counter 61 is controlled, after counter 61 has counted four clock pulses it generates, starting at the leading edges of the pulses Q54 (FIG. 6) at pulse from output 62 by which there is a zero reset at flip-flops 54 and 55 corresponding to the trailing edges of pulses Q55 and Q54. Since each pulse Q54 corresponds to four clock pulses $SH_O$, which are validated by touching key VC, it is after four pulses Q54 that sixteen clock pulses $SH_O$ are thus validated, so generating a pulse at output 71 of the counter 61 of FIG. 4. A pulse is thus generated at the Q output of flip-flops 59 to validate the result of comparing the data IC, that is to say, the confidential code fed in by means of the keys, with the key CLE, and to enable either a signal SV or a signal SE to be transmitted from output 10 or 11 of device DA. The clock pulses transmitted from the output of gate 64 in FIG. 4 are combined in fours in FIG. 6, under the control of pulses generated at the Q output of flip-flop 54. These sequences of four pulses, when transmitted to the address generator GA, enable the four bits of the key CLE to be read out from the memory MCL of FIG. 4 bit by bit over four sequences. The comparison of the bits is performed in comparator 53 under the timing of four clock pulses.

In the case illustrated in FIG. 6, where the keys T9, T2, T3, T4 are touched in succession to form the code CC (9234), each code element, i.e. C9, C2, C3 and C4, is compared with one of the four elements of the key CLE in the course of the four sequences of four clock pulses which are validated by the four touches on key VC. FIG. 6 gives an example of a pulse which is generated at the output of comparator 53 in the event of an error being detected, and of the signal which is generated at the Q output of flip-flop in this case. The signal SE which results only appears at the Q output of flip-flop 70 in FIG. 4 at the moment of validation by the signal generated at the Q output of flip-flop 59, which occurs when the counter 61 has counted sixteen clock pulses $SH_O$.

The invention, as it has been described with reference to two preferred, but non-limiting embodiments, is of particular benefit when applied to systems employing credit and/or debit cards. The fraud which might be practiced as a result of a surreptitious detection of a confidential code at the time when it is formulated on an ordinary keyboard is ruled out in this case by reason of the integrated connections within the card between the plurality of contact terminals or keys which act as a keyboard and the comparator. In addition, the plurality of terminals or keys are generally small in size to prevent visual detection, while still allowing the legitimate owner of the card to distinguish the terminals and keys from one another and to touch one of them with a stylus without making contact with a neighboring key.

I claim:

1. In combination with a data processing system which protects the secrecy of confidential information including a data processing machine with which an operator may carry on a confidental dialogue, the data processing machine being provided with a data transmitting device for communicating with the machine, and said system including an auxiliary device, the auxiliary device having contacts adapted for electrical connection to the data transmitting device, the auxiliary device further having memory means for the permanent storage of a code key for controlling access to the machine and means for comparing this code key with a predetermined confidential code to authorize access to the machine, the improvement comprising said auxiliary device having:

a plurality of key entering contact members entirely separate from the contacts for electrical connection to the data transmitting device of the data processing machine and not connectable to the data processing machine;

integrated connection means respectively connecting the key entering contact members to the code key comparing means; and contact means external to said auxiliary device for generating, as a result of external contact with a predetermined number of said key entering contact members, a set of basic items of information to form said predetermined confidential code for comparison with said code key;

whereby surreptitious detection of the basic items of information by monitoring the electrical connection between the auxiliary device and the date transmitting device is prevented.

2. A data processing system according to claim 1 wherein said auxiliary device further includes an encoder and integrated connecting means for connecting the plurality of key entering contact members to the code key comparing means via said encoder, said encoder having a plurality of inputs equal in number of the number of key entering contact members, the inputs of said encoder being respectively connected to associated key entering contact members by said integrated connections.

3. A data processing system according to claim 2 wherein the contact means external to the auxiliary device comprises an electrical grounding member for selectively successively contacting the key entering contact members to apply signals to corresponding inputs of the encoder, the encoder being arranged to generate in succession, at a predetermined number of outputs, a series of bit combinations, each combination being one of the basic data items forming the predetermined confidential code fed into the auxiliary device upon establishing the external grounding contact with successive specific key entering contact members.

4. A data processing system according to claim 3 wherein the auxiliary device includes an additional contact member separate from the contacts for electrical connection to the data transmitting device of the data processing machine, and the auxiliary device further includes synchronizing circuit means, said synchronizing circuit means being connected to said additional contact member and being operatively controlled by contact of said additional member with said external contact means.

5. A data processing system according to claim 4 which further comprises means external to the auxiliary device for generating a clock signal; and wherein the auxiliary device also includes a buffer register having its inputs connected to the outputs of the encoder and at least one output connected to the code key comparing means, counting circuit means arranged to operate at a rate determined by the clock signal, means connecting the clock signal to said counting circuit means, said counting circuit means being connected on the one hand to the synchronizing circuit means and on the other hand to the memory means for storing the code key, such that the read out of the code key from the memory means takes place in synchronization with the read out of the buffer register to thereby allow the predetermined confidential code to be compared with the code key by the comparing means.

6. A data processing system according to claim 5 wherein the comparing means include discriminating means arranged to generate a first signal for authorizing access to the machine at a first output connected to the data transmitting device, and a second error signal for forbidding access to the machine at a second output connected to the data transmitting device.

7. A data processing system according to claim 1 wherein said auxiliary device further includes an encoder and integrated connecting means for connecting the plurality of key entering contact members to the key code comparing means via said encoder, the inputs of the encoder being respectively connected to associated key entering contact members by said integrated connections, the contact means external to the auxiliary device comprising an electrical ground member for selectively successively contacting the key entering contact members to apply signals to corresponding inputs of the encoder, the encoder being arranged to generate in succession, at a predetermined number of outputs, a series of bit combinations, each combination being one of the basic data items forming the predetermined confidential code fed into the auxiliary device upon establishing the external grounding contact with successive specific key entering contact members.

8. A data processing system according to claim 7 wherein the auxiliary device includes an additional contact member separate from the contacts for electrical connection to the data transmitting device of the data processing machine, and the auxiliary device further includes synchronizing circuit means, said synchronizing crcuit means being connected to said additional contact member and being operatively controlled by contact of said additional member with said external contact means.

9. A data processing system according to claim 8 which further comprises means external to the auxiliary device for generating a clock signal; and wherein the auxiliary device also includes a buffer register having its inputs connected to the outputs of the encoder and at least one output connected to the code key comparing means, counting circuit means arranged to operate at a rate determined by the clock signal, means connecting the clock signal to said counting circuit means, said counting circuit means being connected on the one hand to the synchronizing circuit means and on the other hand to the memory means for storing the code key, such that the read out of the code key from the memory means takes place in synchronization with the read out of the buffer register to thereby allow the predetermined confidential code to be compared with the code key by the comparing means.

10. A data processing system according to claim 9 wherein the comparing means include discriminating means arranged to generate a first signal for authorizing access to the machine at a first output connected to the data transmitting device, and a second error signal for forbidding access to the machine at a second output connected to the data transmitting device.

* * * * *

UNITED STATES PATENT AND TRADEMARK OFFICE
CERTIFICATE OF CORRECTION

PATENT NO. : 4,271,482
DATED : June 2, 1981
INVENTOR(S) : Georges Jean Louis GIRAUD It is certified that error appears in the above–identified patent and that said Letters Patent are hereby corrected as shown below:

In the assignment, "(Societe Anonyme)" should be inserted after "Bull".

Claim 8, column 10, line 54 delete "crcuit" and insert --circuit--.

Signed and Sealed this

First Day of December 1981

[SEAL]

Attest:

Attesting Officer

GERALD J. MOSSINGHOFF

Commissioner of Patents and Trademarks